(12) United States Patent
Wenstrand et al.

(10) Patent No.: US 7,199,783 B2
(45) Date of Patent: Apr. 3, 2007

(54) WAKE-UP DETECTION METHOD AND APPARATUS EMBODYING THE SAME

(75) Inventors: John S. Wenstrand, Menlo Park, CA (US); Bruce Hamilton, Menlo Park, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 337 days.

(21) Appl. No.: 10/360,104

(22) Filed: Feb. 7, 2003

(65) Prior Publication Data

US 2004/0155860 A1    Aug. 12, 2004

(51) Int. Cl.
G09G 5/00    (2006.01)
(52) U.S. Cl. .................... 345/156; 345/213; 345/588
(58) Field of Classification Search ........ 345/156–158,
345/179, 166, 30, 175, 174, 160, 161, 613,
345/169, 173, 213, 588; 713/324, 322;
455/127, 91, 574, 434; 340/442; 342/357.12;
250/221; 367/77; 382/229; 356/28; 379/142,
379/93.31; 341/68; 400/472; 370/335,
370/352; 463/1; 375/141
See application file for complete search history.

(56) References Cited

U.S. PATENT DOCUMENTS

| | | | |
|---|---|---|---|
| 5,396,443 A | | 3/1995 | Mese et al. |
| 5,592,173 A | * | 1/1997 | Lau et al. ............... 342/357.12 |
| 5,605,406 A | * | 2/1997 | Bowen ........................ 400/472 |
| 5,682,157 A | * | 10/1997 | Asmussen et al. ............ 341/68 |
| 5,977,957 A | * | 11/1999 | Miller et al. ................. 345/174 |
| 6,023,612 A | * | 2/2000 | Harris et al. .............. 455/127.1 |
| 6,072,468 A | * | 6/2000 | Hocker et al. ............... 345/157 |
| 6,084,574 A | | 7/2000 | Bidiville |
| 6,105,142 A | * | 8/2000 | Goff et al. .................. 713/324 |
| 6,111,939 A | * | 8/2000 | Brabanec ................ 379/142.04 |
| 6,115,823 A | * | 9/2000 | Velasco et al. .............. 713/322 |
| 6,184,865 B1 | * | 2/2001 | Zimmerman et al. ........ 345/160 |
| 6,227,931 B1 | * | 5/2001 | Shackelford ................. 446/268 |
| 6,269,449 B1 | | 7/2001 | Kocis |
| 6,424,407 B1 | * | 7/2002 | Kinrot et al. ................... 356/28 |
| 6,437,772 B1 | * | 8/2002 | Zimmerman et al. ........ 345/160 |
| 6,498,604 B1 | * | 12/2002 | Jensen ......................... 345/179 |
| 6,668,180 B1 | * | 12/2003 | Vanstone et al. ............ 455/574 |

(Continued)

FOREIGN PATENT DOCUMENTS

DE    10155044    8/2002

(Continued)

OTHER PUBLICATIONS

Microchip, 2001, Microchip Technology Inc. p. 3,19-25.*

(Continued)

*Primary Examiner*—Bipin Shalwala
*Assistant Examiner*—Prabodh Dharia (57) ABSTRACT

An input apparatus is disclosed having a hand-sensing system, a wake-up detector, and a microcontroller. After a period of inactivity, the apparatus is placed into a sleep mode to conserve power. During the sleep mode, an electrical property that the hand-sensing system presents to the wake-up circuit is measured. If the electrical property exceeds a predetermined level, then the input apparatus is activated. In alternative embodiments, an accelerometer, a pressure switch, or a computer system's response can be used to trigger the activation of the input apparatus.

9 Claims, 4 Drawing Sheets

U.S. PATENT DOCUMENTS

| | | |
|---|---|---|
| 6,703,599 B1 * | 3/2004 | Casebolt et al. ............ 250/221 |
| 6,741,335 B2 * | 5/2004 | Kinrot et al. ................. 356/28 |
| 6,781,570 B1 * | 8/2004 | Arrigo et al. ............... 345/158 |
| 6,859,196 B2 * | 2/2005 | Kehlstadt .................... 345/156 |
| 2001/0000125 A1 * | 4/2001 | Zimmerman et al. ....... 345/161 |
| 2002/0051482 A1 * | 5/2002 | Lomp ......................... 375/141 |
| 2002/0061012 A1 * | 5/2002 | Thi et al. .................... 370/352 |
| 2002/0063477 A1 | 5/2002 | Chang et al. |
| 2002/0075145 A1 * | 6/2002 | Hardman et al. ........... 340/442 |
| 2002/0126904 A1 * | 9/2002 | Kakutani et al. ........... 382/229 |
| 2003/0040347 A1 * | 2/2003 | Roach et al. .................. 463/1 |
| 2003/0063045 A1 * | 4/2003 | Fleming ....................... 345/30 |
| 2003/0119503 A1 * | 6/2003 | Shohara et al. ............. 455/434 |
| 2003/0132922 A1 * | 7/2003 | Philipp ........................ 345/173 |
| 2004/0017355 A1 * | 1/2004 | Shim ........................... 345/157 |
| 2004/0189603 A1 * | 9/2004 | Arrigo et al. ............... 345/158 |
| 2004/0196262 A1 * | 10/2004 | Poltorak ...................... 345/163 |
| 2005/0031097 A1 * | 2/2005 | Rabenko et al. ......... 379/93.31 |
| 2005/0073508 A1 * | 4/2005 | Pittel et al. .................. 345/175 |
| 2005/0094604 A1 * | 5/2005 | Ozluturk et al. ............ 370/335 |
| 2005/0276162 A1 * | 12/2005 | Brinkmann et al. .......... 367/77 |
| 2006/0087495 A1 * | 4/2006 | Davis et al. ................ 345/166 |

FOREIGN PATENT DOCUMENTS

| | | |
|---|---|---|
| DE | 20200126 | 8/2002 |
| EP | 0824279 A3 | 12/1998 |
| EP | 0910006 A3 | 5/2000 |
| JP | 10124250 A | 5/1998 |
| JP | 11212721 A | 8/1999 |

OTHER PUBLICATIONS

Description and Specifications of the piezoPAK Accelerometer, ENDEVCO Model 55L.. 2 pages.

Application Specification 114-1089, Accelerometer ACH-01 by Measurement Specialties. Revised Dec. 30, 2000, Revision F. 4 pages.

"Serial Infrared Link Access Protocol (IrLAP)," by Infrared Data Association. Version 1.1, Jun. 16, 1996. Title Page and pp. 2-116.

German Office Action dated Dec. 11, 2006 for German Patent Application No. 10348561.53.

English Translation of German Office Action dated Dec. 11, 2006 for German Patent Application No. 10348561.53.

* cited by examiner

WAKE-UP DETECTION METHOD AND APPARATUS EMBODYING THE SAME

BACKGROUND

The present invention relates to data input devices. More particularly the present invention relates to energy efficient implementation of cordless input devices such as a computer mouse.

In the art of electrical appliances and devices, there is a continuing drive and desire for energy efficiency. Such desire is more acute for portable devices dependent on replaceable batteries for energy. For example, cordless devices for computers and workstations such as cordless mice and keyboards are increasing in popularity. These devices are not tethered to a computer and typically use one or more replaceable batteries as their energy source. Batteries provide a limited supply of power. Therefore, the batteries are replaced periodically for continual use of the devices. Energy efficiency is desired in such devices to decrease power consumption thus increasing battery life leading to lower cost of operation. Further, increases in battery life reduce adverse impact on the ecology associated with waste disposal problems of many batteries. This is because many types of batteries include toxic material. In this document, for convenience of discussion and illustration, a cordless computer mouse is used as an example of an electrical device for which increased energy efficiency is desired.

In an existing technique to increase the energy efficiency of the cordless mouse, the device is configured to operate at two modes of operation—an active mode and a sleep mode. In the active mode, the mouse operates at full operational capacity and consumes the full operation amount of energy. Further, in the active mode, the mouse provides an instantaneous response (or very close to an instantaneous response) to user inputs and movements. When a period of inactivity is detected, the mouse enters the sleep mode where portions of the mouse's circuitry are rendered inactive thereby reducing energy consumption.

During the sleep mode, the mouse periodically monitors its sensors to detect any movement or input from the user. To monitor its sensors, much of the inactivated portions of the mouse are activated, thus consuming power for the duration of the monitoring activity. If movement or input is detected, then the mouse wakes up from the sleep mode and enters the active mode. During the sleep mode, the period of time between the monitoring activities determines the degree to which the energy is consumed and the responsiveness of the mouse to the user input. On the one hand, frequent monitoring provides for better responsiveness of the mouse to the user input. On the other hand, frequent monitoring consumes more energy thus reducing effectiveness of the energy conserving sleep mode.

Consequently, there remains a need for better techniques and devices to minimize power consumption while providing sufficient responses to users.

SUMMARY

The need is met by the present invention. In a first embodiment of the present invention, an input apparatus includes a hand-sensing system, a wake-up detector connected to the hand-sensing system, and a microcontroller connected to the wake-up detector. The wakeup detector detects an electrical property the hand-sensing system presents to the wake-up detector, the wake-up detector adapted to signal the microcontroller if the level of the electrical property detected exceeds a predetermined threshold.

In a second embodiment of the present invention, a method of operating an input apparatus is disclosed. Following a predetermined period of inactivity, portions of the input apparatus are deactivated, thus entering sleep mode. Then, an electrical property presented by the hand-sensing system to the input apparatus is measured to determine a presence of a user hand proximal to the input apparatus. Upon detection of a level of the measured electrical property different than a predetermined level, the input apparatus is activated.

In a third embodiment of the present invention, an input apparatus includes an accelerometer adapted to detect acceleration of the input apparatus and configured to provide an interrupt signal upon the detection of acceleration. A microcontroller is connected to the accelerometer to receive the interrupt signal from the accelerometer. The microcontroller is configured to wakeup the input apparatus upon receipt of the interrupt signal.

In a fourth embodiment of the present invention, a method of operating an input apparatus is disclosed. Following a predetermined period of inactivity, portions of the input apparatus are deactivated, thus entering sleep mode. Acceleration of the input apparatus is detected. Then, the input apparatus is activated.

In a fifth embodiment of the present invention, a method of operating an input apparatus is disclosed. Following a predetermined period of inactivity, portions of the input apparatus are deactivated, thus entering sleep mode. During the sleep mode, activity of the input apparatus is monitored at a lower clock frequency. Upon detection of input activity, the input apparatus is activated.

In a sixth embodiment of the present invention, an input apparatus includes a system clock providing a clock signal at a first signal frequency. A clock divider connected to the system clock is configurable to divide the clock signal to decrease the clock signal to a second signal frequency. A microprocessor connected to the clock divider operates at the first clock signal frequency in an active mode and operates at the second signal frequency in a sleep mode.

In a seventh embodiment of the present invention, a method of operating an input apparatus is disclosed. Following a predetermined period of inactivity, portions of the input apparatus are deactivated, thus entering sleep mode. During the sleep mode, the computer system's response is monitored. Upon detection of the response, the input apparatus is activated.

In an eighth embodiment of the present invention, an input apparatus includes a radio frequency (RF) signal receiver adapted to receive communication from a computer system. A microcontroller connected to the RF signal receiver is adapted to query the computer system and to respond to a response from the computer system by activating the input apparatus from a sleep mode.

Other aspects and advantages of the present invention will become apparent from the following detailed description, taken in conjunction with the accompanying drawings, illustrating by way of example the principles of the invention.

DETAILED DESCRIPTION

As shown in the figures for the purposes of illustration, a first embodiment of the present invention is exemplified by an input apparatus having a hand-sensing system, a wake-up detector connected to the hand-sensing system, and a microcontroller connected to the wake-up detector. The wake-up detector is to detect an electrical property the hand-sensing system presents to the wake-up detector, the wake-up detector having been adapted to signal the microcontroller if level of the electrical property detected exceeds a predetermined threshold. Here, in sleep modes, rather than actually attempting to detect movement or actual use as done in prior art, the input apparatus of the present invention detects presence of hand at or near the input apparatus. Because it is not necessary to detect movement or the actual use of the input apparatus, energy savings can be realized. Further, since the input apparatus of the present invention wakes up at the mere presence of the hand, better response can be provided to the user.

Figure 1:
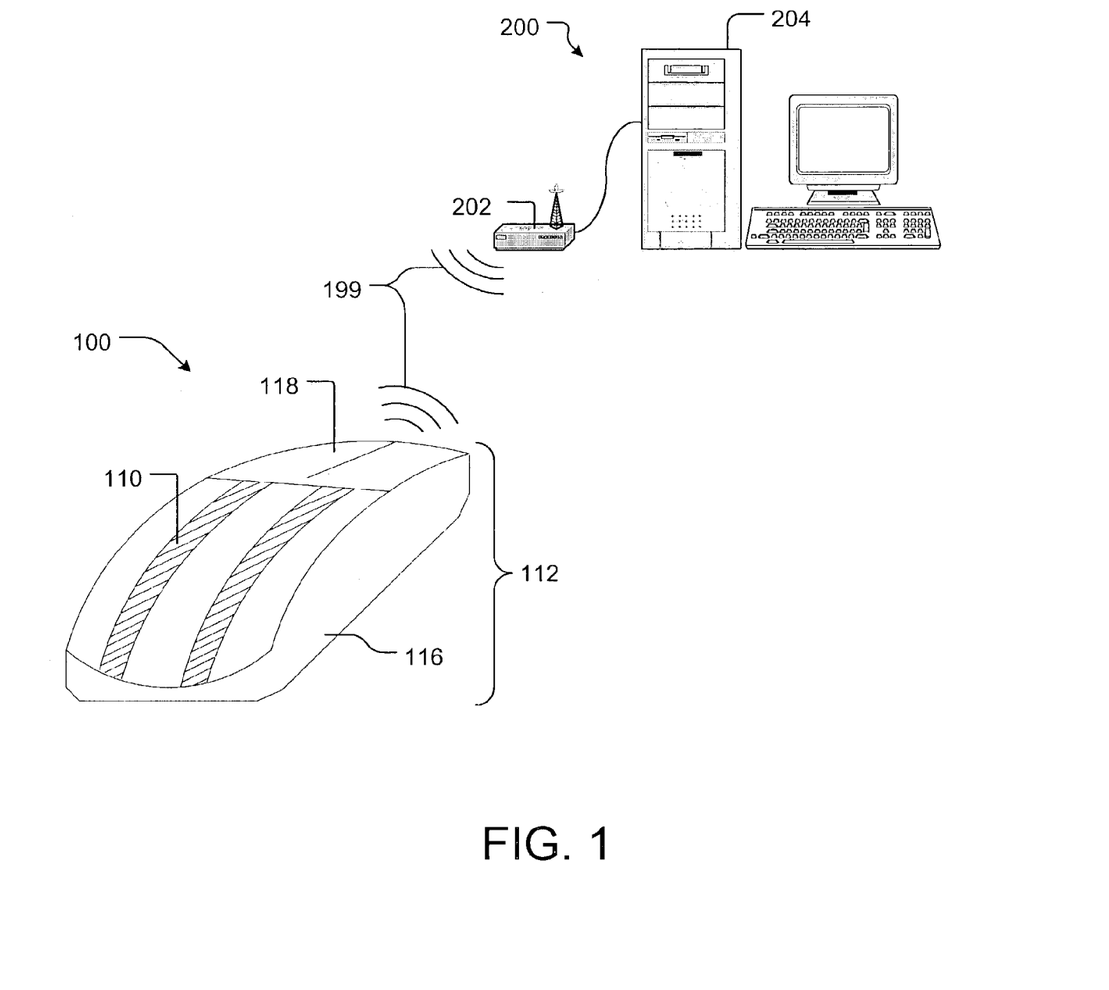
FIG. 1 is a perspective view of an apparatus according to one embodiment of the present invention in context of possible use of the apparatus.

FIG. 1 illustrates an input apparatus 100 according to the first embodiment of the present invention within an environment in which it can be used. Here, for convenience of illustration and discussion, the input apparatus 100 is shown as an optical cordless mouse 100; however, the present invention is not limited to such mouse and can be implemented as a corded (tethered) mouse, tethered or cordless keyboard, or other devices. In the illustrated embodiment, the computer mouse 100 uses radio frequency (RF) signals to communicate with a computer system 200 via a cordless peripheral communication subsystem 202 connected to a computer 204.

Figure 2:
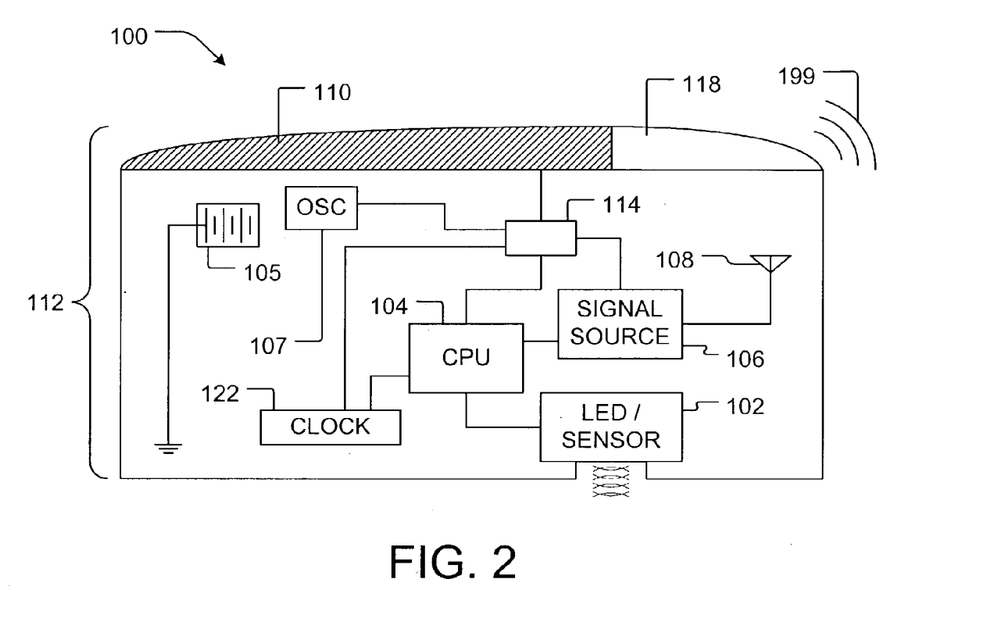
FIG. 2 is a simplified schematic block diagram of a first embodiment of the apparatus of FIG. 1.

FIG. 2 is a simplified schematic block diagram of the mouse 100 of FIG. 1. Referring to FIGS. 1 and 2, the mouse 100 operates either in a normal mode (active mode) or in a sleep mode. During the active mode of operation, a sensor subsystem 102 is used to detect the movements of the mouse 100. The illustrated sample sensor subsystem 102 includes a light emitting diode (LED) and an image sensor, both of which are often found in, for example, an optical computer mouse. The sensor subsystem 102 is connected to a microcontroller 104 receiving signals from the sensor subsystem 102 and controlling the operations of the sensor subsystem 102. The microcontroller 104 interprets the received signals into signals representing movement information. The movement information is sent to the computer system 200 via radio frequency signals 199. The microcontroller 104 is also connected to a radio frequency (RF) signal source 106 that operates with the microcontroller 104 to generate the RF signals 199 including the movement information. A communication antenna 108, connected to the RF signal source 106 can be used to transmit the RF signals 199. For purposes of illustration only, the sensor subsystem 102 is illustrated with an LED and sensors; however, other movement detection mechanisms can be used such as roller ball. Optical sensors, microcontrollers, or a combination of these components are readily available in the marketplace. For example, Agilent Technology, Inc. sells ADNS-2051 series of optical sensors including a microcontroller.

The illustrated mouse 100 draws its power from a power source illustrated as a battery 105. One side of the power source 105 is connected to a ground ("the ground"and the other side ("the power") of the power source 105 is connected to all the components of the mouse 100. To avoid clutter, the power lines are not illustrated in the Figures; however, it is understood and known in the art that the power line and the ground is available and is connected to by the electrical components of the mouse 100. In other embodiments of the present invention, for example a tethered input device, the ground and the power may be connected to a host computer.

When no motion is detected at the mouse 100 for a predetermined period of time (a period of inactivity), then the microcontroller 104 deactivates portions of the mouse 100 to enter the sleep mode. The input apparatus 100 can be deactivated in one or more stages. The microcontroller 104 can deactivate, for example, the sensor subsystem 102, the RF signal source 106, the microcontroller 104 itself, or any combination of these components. The length of the period of inactivity can vary widely depending upon the implementation. For example, the mouse can enter the sleep mode when no motion is detected for several seconds or even less. During the sleep mode, less power is consumed because the deactivated portions of the mouse are drawing relatively less energy compared to the energy drawn during the active mode. There may be differing degrees of sleep mode. In this document the sleep mode includes any mode of operation of the apparatus or the device that is less than the full active mode, "less" including less power consumption, less capability, less speed, or any combination of these.

The mouse 100 includes a hand-sensing system 110, a wake-up detector 114 connected to the hand-sensing system, and the microcontroller connected to the wake-up detector 114. The wake-up detector 114 is configured to detect an electrical property the hand-sensing system presents to the wake-up detector. When the level of the electrical property detected exceeds a predetermined threshold, the wake-up detector 114 signals the microcontroller 104. The predetermined threshold can be set at the time of manufacture of the mouse 100. Alternatively, the predetermined threshold can be adaptively, or dynamically, set by the mouse. For example, the predetermined threshold can be set as the last detected value that did not trigger the wake-up signal. In such configuration, the test to determine whether or not to wake-up is performed as a differentiation of the value of the detected electrical property to the value of the most recent last detected electrical property.

In the illustrated embodiment, the hand-sensing system 110 is implemented as conductive portions 110 of housing 112 of the mouse 100. During the sleep mode, at least one electrical property of the hand-sensing system 110 is measured to determine presence of a user hand proximal to the input apparatus 100. For example, during the sleep mode, the wake-up detector 114 periodically sends a detection signal to the hand-sensing system 110 in predetermined intervals, or periods. The detection signal can be generated by the RF signal source 106, a system clock 122, or a dedicated signal source circuit such as an oscillator 107. Whichever component is used, it is referred as "detection signal source" herein this document.

Each time the detection signal is sent, an electrical property such as radiation load that the hand-sensing system presents to the wake-up detector 114 can be measured by the wakeup detector 114. The conductive portion 110 has physical and electrical properties such that, each time the detection signal is sent to the conductive portions 110, its electrical load is at a precalculated level. When a user's hand is proximal to or touching the hand-sensing system 110, the electrical property that the hand-sensing system presents to the wake-up detector 114 is different than the precalculated level. This is because detection signal is affected by both the hand-sensing system and the proximal hand.

Accordingly, when the detection signal is sent to the conductive portions 110 having a hand proximal to or touching the conductive portions 110, the load (the measured electrical property) measured by the wakeup detector 114 exceeds the precalculated level. For activation criteria, a predetermined threshold such as the load level is set higher than the precalculated level but lower than the measured level. Accordingly, when the user's hand is present proximal to or touches the conductive portions 110, the measured level of the electrical load exceeds the predetermined threshold. When this condition is detected, the wakeup detector 114 signals the microcontroller 104 which, in turn, activates the mouse 100 by activating other portions of the mouse 100 such as the sensor subsystem 102. In fact, in an alternate embodiment, the conductive portion 110 operates as the antenna for transmission of the RF signals 199 rendering the communication antenna 108 unnecessary. In the alternate embodiment, the conductive portion 110 is a dual function antenna operating as the communication antenna during the active mode and as a hand-sensing antenna during the sleep mode.

In the illustrated embodiment of the present invention, the detection signal is a radio frequency pulse from the RF source 106 or the system clock 122, and the detected electrical property is the load that the hand-sensing system 110 presents to the wake-up detector 114 as it receives the RF detection signal. Accordingly, the hand-sensing system 110 can also be referred to as a hand-sensing antenna 110.

The detection signal can be a high frequency pulse having a frequency that is high enough to measure the desired change in the load but also low enough to prevent significant loss of the signal energy. In this case, the frequency of the detection signal should be high enough to radiate so as to detect the load changes. The higher the frequency, easier to detect the load change. For example, the detection signal frequency can range between 27 MHz and 2.4 GHz. In practice, the detection signal can use the same oscillator and signal frequency generated and used by the signal source 106 and is also used to communicate with the host computer 200. The duration of the detection signal pulse can be minimized to achieve minimum power utilization and to allow sufficient time for an oscillator of the signal source to stabilize and gather load. Currently, 27 MHz is a common frequency at which cordless mice communicate with the host computer 200.

The detection can be performed with a predetermined frequency. Alternatively, the detection can be performed adaptively depending on activity. One adaptive technique is the exponential back-off technique using three parameters—initial measurement period, exponential multiplication factor, and maximum measurement period. Once the mouse 100 enters the sleep mode, the electrical property of the hand sensing system 110 is measured after the initial period, for example 10 milliseconds (ms), to detect presence of a user's hand. The period (the measurement period) of time between the measurements of the electrical property of the hand sensing system 110 is increased by the exponential multiplication factor. For example, if the exponential multiplication factor is set at 1.1, then measurement period is set to 1.1 times the previous measurement period. In the current example, the second measurement period is 1.1 times 10 ms which is 11 ms. As can be calculated, the measurement period increases quickly thereby allowing the measurement of the detection of a proximal user hand to be performed less often as the time of non-use increases. To ensure that the response of the mouse 100 remains acceptable, the maximum measurement period can be set such that the exponential multiplication factor is not applied after the maximum measurement period is reached. For example, the maximum measurement period can be set at 500 ms.

The threshold level for loading or another electrical property can be adaptively adjusted based on historical correlation with other indications of actual usage such as motion reports from the sensor subsystem 102 to tune sensitivity of wakeup to individual usage patterns. For example, the predetermined threshold level can be set as the last detected value that did not trigger the wake-up signal. In such configuration, the measurement to determine whether or not to wake-up is performed as a differentiation of the value of the measured electrical property to the value of the most recent last measured electrical properly. This can be implemented using a comparator circuit, for example voltage comparator which is known in the art.

The housing 112 of the mouse 110 may include other portions such as non-conductive portions 116, buttons 118, and other input mechanisms such as a scroll wheel, not shown in the Figures.

Other electrical properties of the hand-sensing system 110 can be measured in alternative to or in addition to the load. For example, other measured electrical, properties can be a derivative of the load, average current to the hand-sensing system 110, peak or RMS (root mean squared) current to the hand-sensing system 110, voltage across a resistor when the hand-sensing system 110 is implemented as a resistor.

In fact, in an alternative embodiment of the present invention, detection of slight changes in the electrostatic potential of the hand-sensing system 110 (caused by initial contact or proximity of the hand to the conductive portions 110) can be used as a trigger the sampling of the hand-sensing system 110 as already described. Here, the electrical potential or other electrical property of the hand-system 110 can also be understood to mean the electrical potential or other electrical property the hand-system 110 presents to the wake-up circuit.

Figure 3:
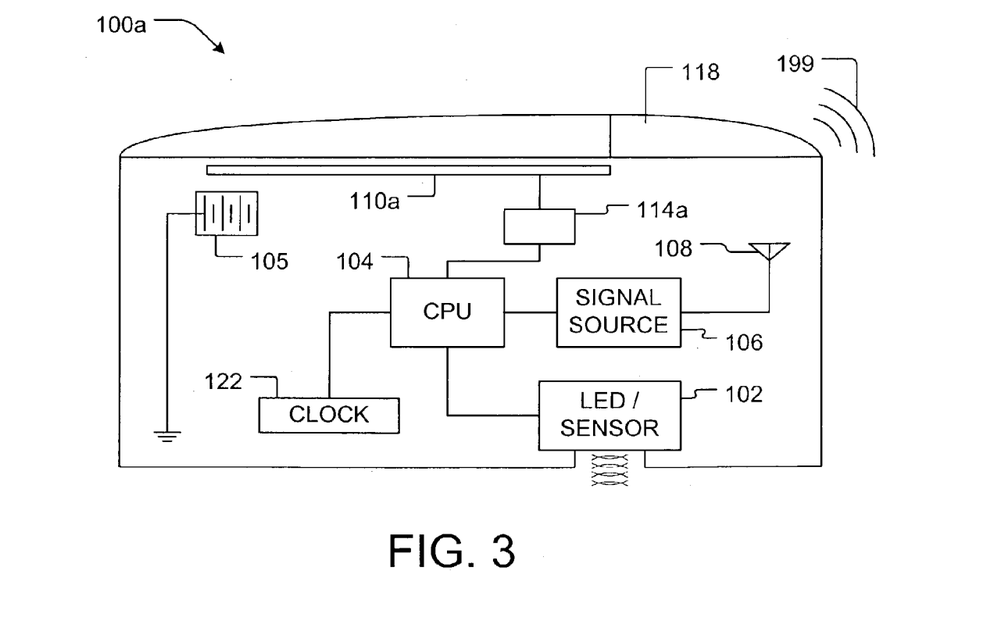
FIG. 3 is a simplified schematic block diagram of a second embodiment of the present invention.

A second embodiment of the invention having certain alternative configuration is illustrated in FIG. 3. Portions of the input apparatus 100a shown in FIG. 3 are similar to those shown in FIG. 2. For convenience, portions in FIG. 3 that are similar to portions in FIG. 2 are assigned the same reference numerals, analogous but changed components are assigned the same reference numerals accompanied by letter "a", and different portions are assigned different reference numerals.

Referring to FIG. 3, the apparatus 100a includes a capacitive sensor 110a as the hand-sensing system 110a. The wake-up detector 114 is adapted to detect capacitance the hand-sensing system 110a presents to the wake-up detector 114a. When the user's hand is proximal to the apparatus 110a, the capacitance that the capacitive sensor 110a presents to the wake-up detector 114 is different than the capacitance that the capacitive sensor 110a presents to the wake-up detector 114 when no hand is near.

Figure 4:
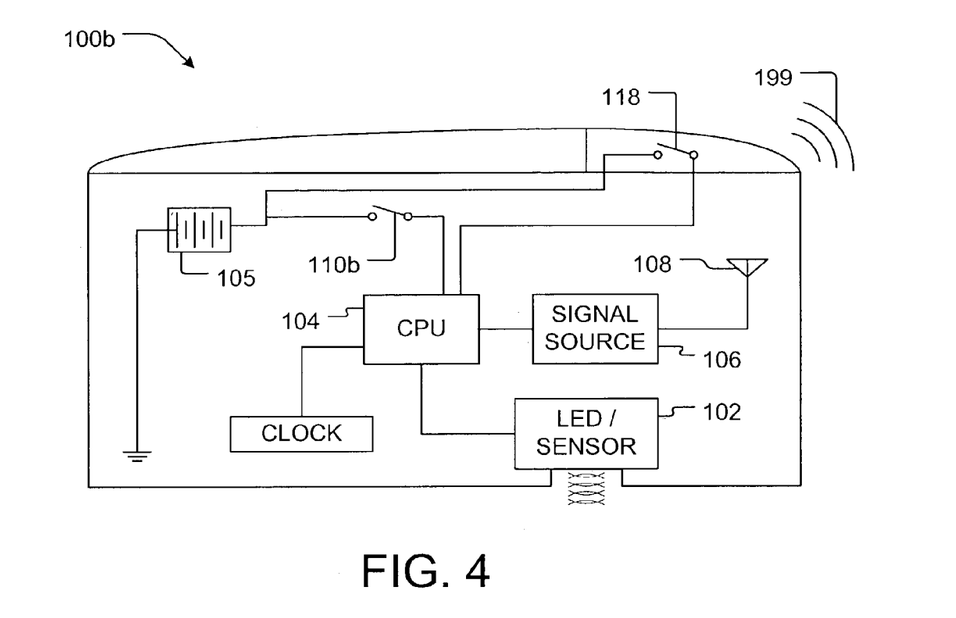
FIG. 4 is a simplified schematic block diagram of a third embodiment of the present invention.

A third embodiment of the invention having another alternative configuration is illustrated in FIG. 4. Portions of the input apparatus 100b shown in FIG. 4 are similar to those shown in FIG. 2. For convenience, portions in FIG. 4 that are similar to portions in FIG. 2 are assigned the same reference numerals, analogous but changed components are assigned the same reference numerals accompanied by letter "b", and different portions are assigned different reference numerals.

Referring to FIG. 4, the apparatus 100b includes a pressure switch 110b as a combined hand-sensing system and wake-up detector. Here, when a user's hand is present on the apparatus 100b, weight of the hand closes the pressure switch 100b thereby sending a signal, for example the power from the battery 105, to the microcontroller 104. Then, the microcontroller 104 activates the apparatus 100b to enter the active mode. A slew of pressure switches are available in the marketplace.

Alternatively, one of the mouse buttons, for example, button 118 (illustrated in more detail in FIG. 4 compared to the other FIGS.) can be used as the pressure switch. In such a configuration, the first click (closure) of the button 118 following an entrance into the sleep mode would not be transmitted to the host computer 200 of FIG. 2. Rather, the signal from the first click is used by the microcontroller 104 as a wake-up signal to activate the mouse 100b.

Figure 5:
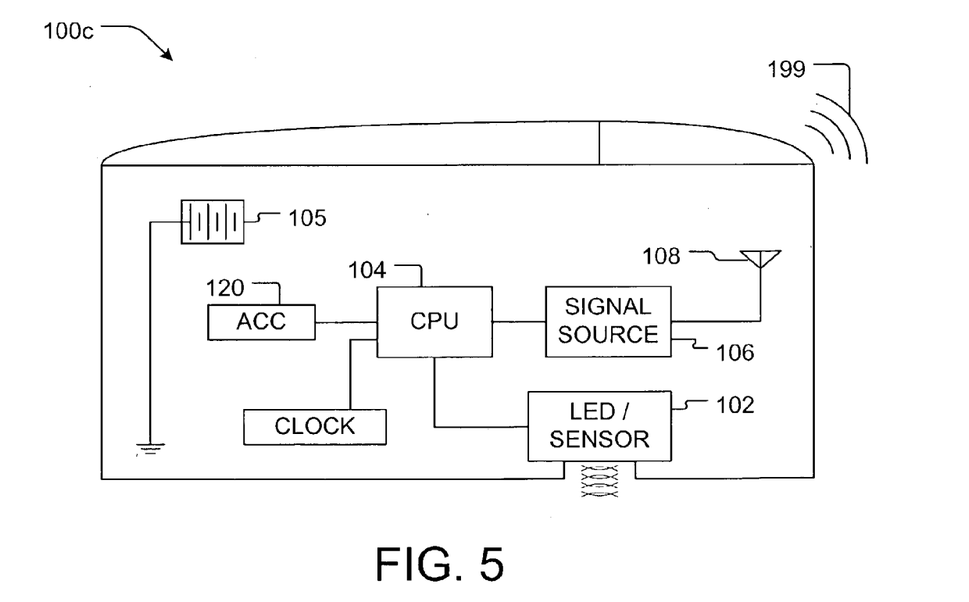
FIG. 5 is a simplified schematic block diagram of a fourth embodiment of the present invention.

A fourth embodiment of the invention having yet another alternative configuration is illustrated in FIG. 5. Portions of the input apparatus 100c shown in FIG. 5 are similar to those shown in FIG. 2. For convenience, portions in FIG. 5 that are similar to portions in FIG. 2 are assigned the same reference numerals, analogous but changed components are assigned the same reference numerals accompanied by letter "c", and different portions are assigned different reference numerals.

Referring to FIG. 5, the input apparatus 100c similar to apparatus 100 of FIG. 2 in that the mouse 100c operates either in the normal mode (active mode) or in the sleep mode. During the active mode of operation, the sensor subsystem 102 is used to detect the movements of the mouse 100c. The sensor subsystem 102 is connected to a microcontroller 104 receiving signals from the sensor subsystem 102 controlling the operations of the sensor subsystem 102. The microcontroller 104 interprets the received signals into signals representing movement information. The movement information is sent to the computer system 200 of FIG. 1 via radio frequency (RF) signals 199. The microcontroller 104 is also connected to the RF signal source 106 that operate with the microcontroller 104 to generate the RF signals 199 including the movement information. A communication antenna 108, connected to the RF signal source 106 can be used to transmit the RF signals 199. For purposes of illustration, the sensor subsystem 102 is illustrated with an LED and sensors; however, other movement detection mechanisms can be used such as roller ball.

When no motion is detected for a predetermined period of time (a period of inactivity), the microcontroller 104 deactivates portions of the mouse 100c to enter the sleep mode. The microcontroller 104 can deactivate the sensor subsystem 102, the RF signal source 106, the microcontroller 104 itself, or any combination of these components. The length of the period of inactivity can vary widely depending upon the implementation. For example, the mouse can enter the sleep mode when no motion is detected for several seconds. During the sleep mode, less power is consumed because the deactivate portions of the mouse is drawing very little, if any, energy.

When the mouse 100c is moved, the acceleration of the mouse 100c is detected by an accelerometer 120 which sends an interrupt signal to the microcontroller 104. Upon receiving the interrupt signal, the microcontroller activates, or wakes-up, the components of the mouse 100c from the sleep mode. The accelerometer 120 can be a micro-electro-mechanical (MEMS) device available in the market place. Suitable accelerometers are available in the marketplace. For example only, Endevco Corporation of San Juan Capistrano, Calif., makes PIEZOPAK® line of products some of which can be used in some implementations of the present invention.

Figure 6:
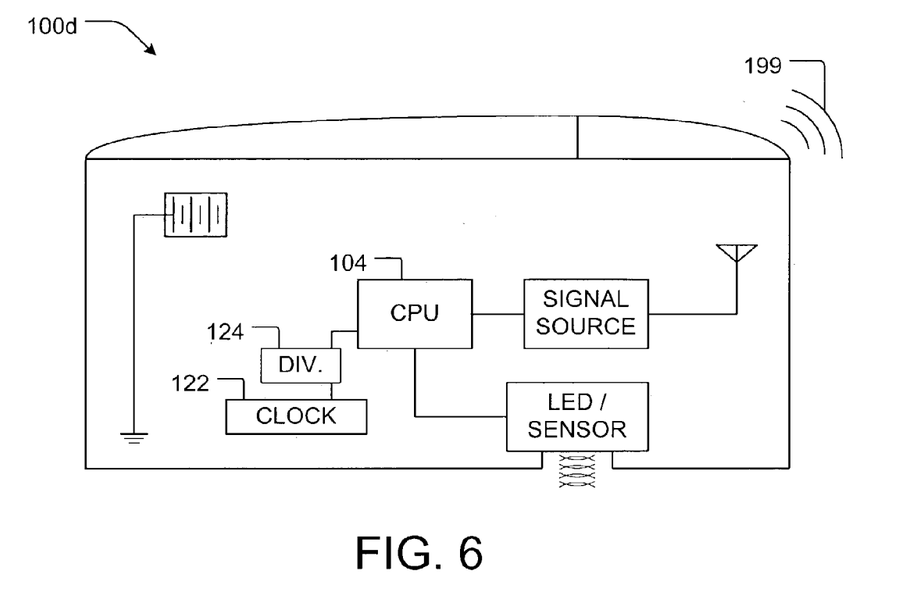
FIG. 6 is a simplified schematic block diagram of a fifth embodiment of the present invention.

A fifth embodiment of the present invention is illustrated in FIG. 6. Portions of the input apparatus 100d shown in FIG. 6 are similar to those shown in FIG. 2. For convenience, portions in FIG. 6 that are similar to portions in FIG. 2 are assigned the same reference numerals, analogous but changed components are assigned the same reference numerals accompanied by letter "d", and different portions are assigned different reference numerals.

Referring to FIG. 6, the input apparatus 100d similar to apparatus 100 of FIG. 2 in that the mouse 100d operates either in the normal mode (active mode) or in the sleep mode. During the active mode of operation, the sensor subsystem 102 is used to detect the movements of the mouse 100d. In the active mode, the microcontroller 104 and the rest of the components of the mouse 110d operates at a particular system clock frequency, a first clock frequency, for example, at 27 MHz.

When no motion is detected for a predetermined period of time (a period of inactivity), the microcontroller 104 deactivates portions of the mouse 100d to enter the sleep mode. For example, the RF source 106 and the sensor subsystem 102 can be deactivated, thus reducing the amount of energy used by the mouse 100d. During the sleep mode, the microcontroller 104 periodically monitors activity of the mouse 100d. For example, the microcontroller 104 activates the sensor subsystem 102 only to check for movement of the mouse 100d. The monitoring activity of the mouse 100d during the sleep mode is performed at a second clock frequency that is lower than the first clock frequency. The second frequency, for example, can be half of the first frequency. When input activity is detected, for example, movement of the mouse 100d is detected, the mouse 100d is activated. In fact, the second frequency can be adaptive in that, as the period of sleep increases, the second frequency can be further decreased using the exponential back-off technique (discussed above) to increase the energy savings. In such an implementation, the three parameters would be the initial second frequency, an exponential multiplication factor, and a minimum second frequency where the exponential multiplication factor would be less than one such that the second frequency at which the mouse 100d operates is reduced at each subsequent monitoring activity.

The first clock frequency can be divided by a clock divider 124 connected between the microcontroller 104 and the system clock 122. The divider 124 can be configured at the time the sleep mode is entered into, to divide the system clock signal at the first clock frequency to produce a system clock signal at the second clock frequency. Operating the microcontroller 104 and other system components such as the sensor subsystem 102 at a reduced clock frequency provides coarse movement information compared to the finer movement information available at the higher frequency operations. However, the reduced clock frequency allows these components to draw less energy. Further, during the sleep mode, fine movement information is not likely to be critical.

A sixth embodiment of the present invention is applicable in the context of using an input device communicating with a computing system. In the prior art, a cordless input device is often configured as a transmission unit only to save component costs. However, in that configuration, the cordless device cannot be made aware that its signals are being received by a computer or are being wasted. For example, when the computer (to which the prior art input device is transmitting) is turned off for an extended period of time, the prior input device can be operating needlessly (in active mode or in sleep mode) wasting energy.

Figure 7:
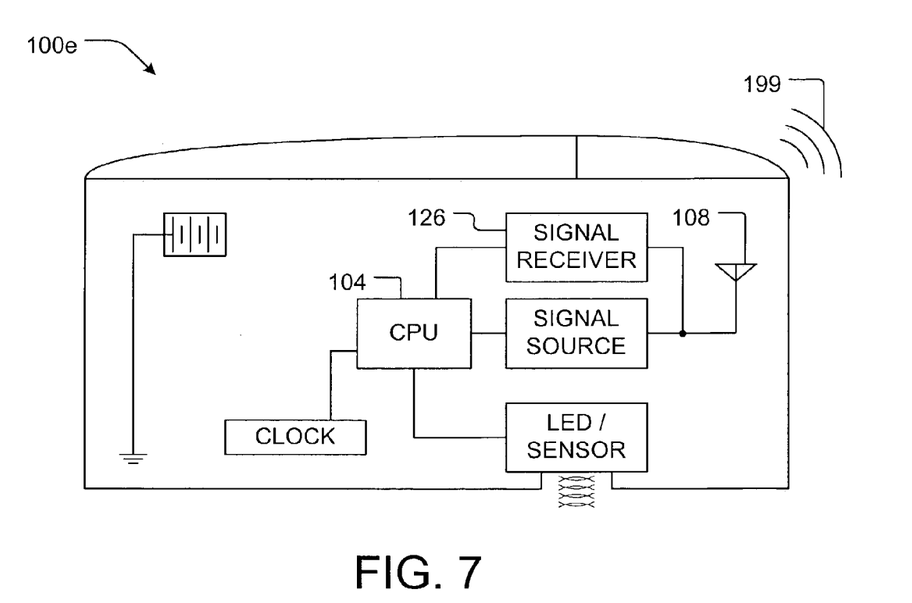
FIG. 7 is a simplified schematic block diagram of a sixth embodiment of the present invention.

The sixth embodiment of the present invention is illustrated in FIG. 7. Portions of the input apparatus 100e shown in FIG. 7 are similar to those shown in FIG. 2. For convenience, portions in FIG. 7 that are similar to portions in FIG. 2 are assigned the same reference numerals, analogous but changed components are assigned the same reference numerals accompanied by letter "e", and different portions are assigned different reference numerals.

Referring to FIG. 7, the input apparatus 100e similar to apparatus 100 of FIG. 2 in that the mouse 100e operates either in the normal mode (active mode) or in the sleep mode. During the active mode of operation, the sensor subsystem 102 is used to detect the movements of the mouse 100e. When no motion is detected at the mouse 100e for a predetermined period of time (a period of inactivity), then the microcontroller 104 deactivates portions of the mouse 100e to enter the sleep mode.

During the sleep mode, the microcontroller 104 monitors the computer system 200 of FIG. 1 by listening for a query signal. For example, if an infrared protocol is used, a query based on the Discovery-XID-Cmd frame described in "Serial Infrared Link Access Protocol (IrLAP)" defined by the Infrared Data Association can be used. Alternatively, the mouse 100e monitors, or listens, for a query from the computer system 200 via its RF receiver 126. Upon detecting the query, the input apparatus is activated. Such query-response techniques are often known as hand-shake and are known in various arts such as, for example, RF communication protocol and Infrared communication protocol. The monitor cycle can be repeated periodically at a predetermined period, the period ranging from fractions of a second to several seconds or more. For example, the predetermined period can be within a range between 0.5 and 30 seconds. The period can relate to the start-up time of a computer system such that the input apparatus 100e can detect the response and wake-up during the computer boot-up sequence such that the mouse is in active mode when the boot-up sequence is complete. Again, the query and monitor cycle can be repeated at varying intervals, the intervals adaptively configurable using, for example, the exponential back-off technique explained above.

From the foregoing, it will be apparent that the device of the present invention is novel and offers advantages over the current art. The invention provides a user with an input device that decreases power consumption during periods of inactivity while providing an increase in response time to user activity. Although a specific embodiment of the invention is described and illustrated above, the invention is not to be limited to the specific forms or arrangements of parts so described and illustrated. The invention is limited only by the claims.

What is claimed is:

1. a method of operating an input apparatus adapted to communicate with a computer system, the method comprising: deactivating portions of the input apparatus following a predetermined period of inactivity, thus entering sleep mode; monitoring signals from the computer system during the sleep mode, wherein said step of monitoring comprises periodically listening for a query signal from the computer system according to a monitoring cycle interval, wherein the monitoring cycle interval is adaptively changed during the sleep mode by implementation of an exponential back-off technique to vary the monitoring cycle interval over time during the sleep mode, implementing an exponential back-off technique to vary the monitoring cycle interval over time during the sleep mode; and activating the input apparatus upon detection of a query from the computer system.

2. the method recited in claim 1 wherein the monitoring cycle interval has a period in arrange from 0.5 to 30 seconds.

3. an input apparatus comprising: a signal receiver adapted to receive communication from a computer system; and a microcontroller connected to said signal receiver adapted to listen to the computer system and to respond to a query from the computer system by activating the input apparatus from a sleep mode, wherein the microcontroller is further adapted to periodically listen for a query signal from the computer system according to a monitoring cycle interval and to adaptively change the monitoring cycle interval during the sleep mode, wherein the microcontroller is further adapted to adaptively change the monitoring cycle interval according to an exponential back-off technique in which the duration of a subsequent monitoring cycle interval increases relative to the duration of a previous monitoring cycle interval.

4. The input apparatus recited in claim 3 further comprising a signal source adapted to generate signals for transmission to the computer system.

5. The input apparatus recited in claim 4 wherein said signal source generates a signal selected from a group consisting of RF signals and infrared signals.

6. an input apparatus comprising: a system clock configured to provide a clock signal at a first signal frequency; a clock divider connected to the system clock configurable to divide the clock signal to thereby decrease the clock signal to a second signal frequency; and a microprocessor connected to said clock divider, said microprocessor configured to operate at the first signal frequency in an active mode and to operate at the second signal frequency in a sleep mode; wherein the clock divider is further configured to adaptively change the second signal frequency in the sleep mode by implementation of an exponential back-off technique to decrease the second signal frequency over time in the sleep mode.

7. The input apparatus recited in claim 6 wherein the input apparatus comprises a computer mouse.

8. a method of operating an input apparatus, the method comprising: operating at a first clock frequency during active mode of operation; deactivating portions of the input apparatus following a predetermined period of inactivity, thus entering sleep mode; monitoring activity of the input device during the sleep mode at a second clock frequency; adaptively changing the second clock frequency during the sleep mode by implementing an exponential back-off technique to decrease the second clock frequency over time during the sleep mode; and activating the input apparatus upon detection of input activity.

9. The method recited in claim 8 wherein said step of activating comprises activating the portions of the input apparatus upon detection of the input activity.

* * * * *

UNITED STATES PATENT AND TRADEMARK OFFICE
CERTIFICATE OF CORRECTION

PATENT NO. : 7,199,783 B2
APPLICATION NO. : 10/360104
DATED : April 3, 2007
INVENTOR(S) : John Wenstrand Page 1 of 1

It is certified that error appears in the above-identified patent and that said Letters Patent is hereby corrected as shown below:

Col. 2 Line 1 Delete "p." and insert -- pp. --, therefor.

Col. 9 Line 64 In Claim 1, delete "a" and insert -- A --, therefor.

Col. 10 Line 13 In Claim 2, delete "the" and insert -- The --, therefor.

Col. 10 Line 14 In Claim 2, delete "arrange" and insert -- a range --, therefor.

Col. 10 Line 15 In Claim 3, delete "an" and insert -- An --, therefor.

Col. 10 Line 36 In Claim 6, delete "an" and insert -- An --, therefor.

Col. 10 Line 51 In Claim 8, delete "a" and insert -- A --, therefor.

Signed and Sealed this

Thirtieth Day of June, 2009

JOHN DOLL
*Acting Director of the United States Patent and Trademark Office*